June 20, 1944.  D. L. CHRISTOFEL  2,351,662
SHOCK ABSORBER
Filed Jan. 22, 1942
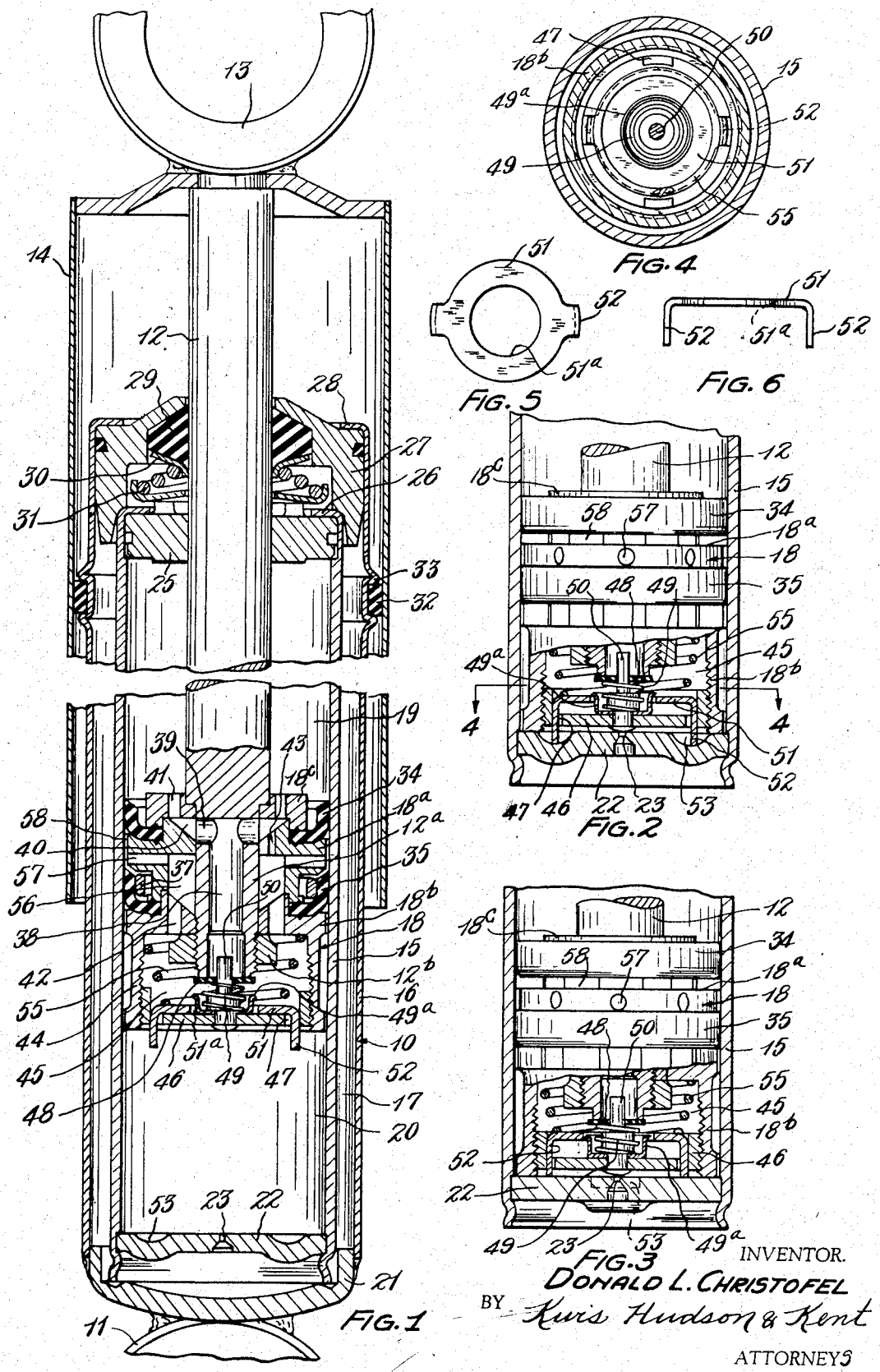
INVENTOR.
DONALD L. CHRISTOFEL
BY Kwis Hudson & Kent
ATTORNEYS Patented June 20, 1944

2,351,662

UNITED STATES PATENT OFFICE 2,351,662

SHOCK ABSORBER

Donald L. Christofel, East Cleveland, Ohio, assignor to The Gabriel Company, Cleveland, Ohio, a corporation of Ohio Application January 22, 1942, Serial No. 427,783

5 Claims. (Cl. 188—88)

This invention relates to fluid shock absorbers, and more particularly, to fluid shock absorbers of the direct acting tubular type.

An object of this invention is to provide an improved shock absorber of this character embodying novel means for adjusting its operating characteristics.

Another object of my invention is to provide an improved shock absorber of this character having a piston provided with an adjustable flow-control means, and in which an adjusting member for said flow-control means is carried by the piston for cooperating with the end wall of the cylinder and is retractable into the piston when the latter "bottoms" against said end wall.

The invention may be further briefly summarized as consisting in certain novel combinations and arrangements of parts hereinafter described and particularly set out in the appended claims.

In the accompanying sheet of drawing:

Fig. 1 is a longitudinal sectional view taken through a hydraulic shock absorber embodying my invention;

Fig. 2 is a partial longitudinal sectional view of the device with the adjusting means of the piston in register with the adjusting recesses of the end wall of the cylinder;

Fig. 3 is a view similar to Fig. 2, but with the adjusting means of the piston out of register with the adjusting recesses of the end wall of the cylinder;

Fig. 4 is a transverse sectional view taken through the device on line 4—4 of Fig. 2;

Fig. 5 is a plan view of the adjusting member showing the same removed from the piston; and Fig. 6 is a side elevation of such adjusting member.

The shock absorber embodying my invention and illustrated in the accompanying drawing will now be described in greater detail, but it will be understood, of course, that the invention is not limited to this particular shock absorber, but may be embodied in various other similar devices.

The fluid shock absorber covered by this application is an improvement over the shock absorber disclosed in United States Patent No. 2,263,284 granted November 18, 1941.

In the drawing I show my shock absorber as comprising in general a casing 10 having an eye 11 at one end thereof for connection with one of a pair of relatively movable members to be retarded and a rod 12 extending from the other end of the casing and having a similar eye 13 at its outer end for connection with the other of said pair of relatively movable members. The rod 12 may also carry a tubular guard 14 which telescopes around the upper end of the casing. The casing 10 comprises a tubular cylinder 15 and a reservoir barrel 16 surrounding the cylinder and spaced therefrom to provide the reservoir chamber 17 therebetween. A piston 18 connected with the inner end of the rod 12 is reciprocable in the cylinder 15 and divides the same into upper and lower chambers 19 and 20.

The lower end of the reservoir barrel 16 has a closure cap or plug 21 connected therewith, as by welding or the like, and which carries the eye 11. The lower end of the cylinder barrel 15 is closed by means of a disk or plug 22 retained therein and provided with a restricted orifice 23 which connects the cylinder chamber 20 with the reservoir chamber 17. The upper end of the cylinder barrel 15 is closed by means of a disk or plug 25 which is retained in the cylinder barrel by the end flange 26 and forms a guide or bearing for the piston rod 12. The upper end of the reservoir barrel 16 is closed by means of a plug 27 which is retained therein by the end flange 28. The plug 27 carries a flexible packing ring 29 which surrounds the piston rod 12 and is sealingly pressed against the latter by means of the disk 30 and the tapered compression spring 31.

The tubular guard 14 shields the piston rod 12 from dust, stones, and other foreign matter. The entry of foreign matter between the guard 14 and the reservoir barrel 16 may be prevented by a packing ring 32 which has wiping engagement with the inner surface of the guard. For mounting the packing ring 32 on the casing 10, I may construct the reservoir barrel 16 with a pair of axially spaced integral annular shoulders 33 which define a groove in which the packing ring 32 is seated. As shown in Fig. 1, the wall of the cylinder barrel 16 may be spun or otherwise suitably deflected to form the upstanding annular shoulders or ridges 33 thereon.

The cylinder chambers 19 and 20 and the reservoir chamber 17 contain a suitable resistance fluid with which the piston 18 cooperates to produce a shock absorbing action, as will be presently explained in greater detail. The piston 18 comprises a body formed of three sections 18a, 18b, and 18c which are mounted on the reduced portion 12a of the piston rod and are retained thereon by means of the nut 12b. The piston is provided with a pair of cup-like flexible washers 34 and 35 which are formed of leather or other suitable material. The washer 34 is clamped between the two sections 18c and 18a of the piston body and the washer 35 is clamped between the two sections 18a and 18b of the piston body. The washer 35 is frictionally pressed against the wall of the cylinder 15 by means of an expansible spring ring 37.

To permit a controlled flow of fluid during movement of the piston 18 in the cylinder 15, I provide a path of flow through the piston, which includes the axial and radial passages 38 and 39 of the piston rod, the annular space 40 in the intermediate section 18a of the piston body, and a plurality of openings 41 in the upper section 18c of the piston body. The fluid passages of the piston also include a plurality of circumferentially spaced axial openings 42 in the lower section 18b of the piston body and one or more openings 43 in the intermediate section 18a.

As shown in Fig. 1, the lower section 18b of the piston body is provided with an axially extending sleeve or skirt portion 44 having a chamber 45 therein with which the passage 38 of the piston rod connects. The chamber 45 is provided at its lower end with a plug 46 having screw connection with the sleeve portion 44 of the piston body and provided with a plurality of circumferentially spaced slots 47 which connect the chamber 45 with the cylinder chamber 20. The lower end of the passage 38 is controlled by a valve disk 48, formed of composition or other suitable material, which is held against the lower end of the passage by a valve spring 49 disposed between such valve and the plug 46. An axially extending guide pin 50, which is riveted or otherwise connected with the plug 46, extends through the valve 48 and retains the latter in proper position with respect to the lower end of the passage 38. A retaining cup 49a for the lower end of the valve spring 49 may be connected with the plug 46 by the rivet portion of the guide pin 50.

During the compression stroke of the shock absorber, some of the fluid in the chamber 20 flows upwardly through the slots 47, into the piston chamber 45, and then through the passages 42, the annular space 56, the radial passages 57, the longitudinal grooves 58, and around the washer 34 into the upper chamber 19. Fluid from the chamber 20 is also forced upwardly through the slots 47, into the piston chamber 45, and then through the passages 42, the passage or passages 43, the annular space 40, and the openings 41, into the chamber 19. A portion of the resistance is obtained from the frictional drag of the washer 35 on the cylinder wall and from the restricted flow of fluid through the orifice 23 into the reservoir chamber 17, resulting from the displacement of fluid from the cylinder as the piston rod 12 moves thereinto. It will be understood that the amount of resistance to be developed by the shock absorber on the compression stroke can be selected or varied as desired by making the orifice 23 of the cylinder of appropriate size or area.

On the rebound stroke, the piston 18 moves upwardly in the cylinder and the fluid in the chamber 19 is then subjected to pressure and is forced downwardly through the openings 41, the annular space 40, the opening or openings 43, the openings 42, the piston chamber 45, and through the slots 47 into the chamber 20. During this stroke of the piston, the washer 34 is sealingly pressed against the cylinder wall by the fluid pressure in the chamber 19. The restriction offered by these passages, and mainly by the passage or passages 43, produces a desired portion of the shock absorbing resistance on the rebound stroke. A portion of the shock absorbing resistance on the rebound stroke is also produced by the frictional drag of the washer 35. If the fluid pressure built up in the chamber 19 during the rebound stroke exceeds a predetermined value, it will unseat the valve 48 and an additional flow of fluid will then take place downwardly through the passage 38 of the piston rod and the piston chamber 45 to the cylinder chamber 20. The openings 41 of the piston section 18c are of a size such that their aggregate area is equal to the area of the passage 38.

The resistance to be developed by the shock absorber on the rebound stroke can be adjusted or varied as desired by varying the compression of the valve spring 49. This may be done by screwing the plug 46 into or out of the internally threaded sleeve portion 44 of the piston. To enable this to be done with the shock absorber fully assembled, I provide the piston with an adjusting member 51 having arm portions 52 which project through the slots 47 and cooperate with recesses 53 formed in the end wall or plug 22 of the cylinder barrel 15 when the shock absorber is in its collapsed condition.

The body portion of the adjusting member 51 is disposed in the piston chamber 45 and may have an opening 51a therein which permits the spring cup 49a surrounding the valve spring 49 to seat against the plug 46. A second spring 55 in the piston chamber 45 normally holds the adjusting member 51 against the plug 46 so that the arms 52 will project from the lower end of the piston for engagement in the recesses 53, as shown in Fig. 2. When the arms 52 have been engaged in these recesses, the piston rod and casing 10 are rotated relative to each other to thereby cause the plug 46 to be screwed into or out of the threaded sleeve portion 44 of the piston to increase or decrease the compression of the valve spring 49. The spring 55 exerts a pressure on the plug 46 through the adjusting member 51 and this produces a locking effect on the threaded connection between the plug 46 and the sleeve portion 44 tending to hold the plug against relative rotation. The spring 55 thus serves two purposes, namely, to project the arms 52 through the slots of the plug 46 and to lock the adjusting means for the valve spring 49 against shifting during the normal operation of the shock absorber.

At times during the operation of my shock absorber, the lower end of the piston 18 may strike or "bottom" against the end wall 22 of the cylinder 15. The arrangement just described above prevents the arms 52 of the adjusting member 51 from becoming bent or otherwise damaged as the result of such "bottoming" of the piston because it permits the adjusting member 51 to be retracted or pushed upwardly more or less into the piston chamber 45 by the engagement of the arms 52 against the end wall 22. If the arms 52 of the adjusting member are in register with the recesses 53 of the end wall, the adjusting member will be retracted only to the extent indicated in Fig. 2, but if the arms 52 are not in register with the recesses 53, the adjusting member will be retracted for a greater distance, as shown in Fig. 3. When the adjusting member is thus retracted into the piston chamber 45, it acts in opposition to the spring 55, and as soon as the piston moves away from the end wall 22, this spring will cause the arms 52 to be immediately projected through the slots 47 of the plug 46.

It will be observed that when the compression of the valve spring 49 is to be changed and the piston has been moved to the position shown in Fig. 2 for this purpose, the body portion of the adjusting member 51 will lift the spring 55 and will relieve the pressure on the threaded connection of the plug 46 so that the latter can be rotated with very little effort to adjust the valve spring 49. It should also be explained that with the valve-spring adjusting means which I have provided, the operation of adjusting the shock absorber can be carried out more rapidly than heretofore because the arms 52 of the adjusting member 51 can be quickly and easily engaged in the recesses 53 of the end wall of the cylinder. I find that with my improved arrangement, the arms 52 cause an audible click when they drop into the recesses 53 during the initial relative rotation between the casing and piston. In some cases it is desirable to eliminate the adjustment feature from the shock absorber, and with my improved construction this can be readily done without disturbing the operating characteristics of the shock absorber by simply omitting the adjusting member 51. When this has been done, the spring 55 bears directly against the plug 46 and retains the latter in the desired adjustment to which the plug has been initially set.

From the foregoing description and the accompanying drawing, it will now be readily understood that I have provided an improved double acting fluid shock absorber having novel means for adjusting the operating characteristics of the device.

While I have illustrated and described my improved shock absorber in more or less detail, it will be understood, of course, that I do not wish to be limited to the particular arrangements of parts and details of construction herein disclosed, but regard my invention as including such changes and modifications as do not constitute a departure from the spirit of the invention and the scope of the appended claims.

Having thus described my invention, I claim:

1. In a shock absorber, a cylinder having an end wall provided with a recess radially offset from the cylinder axis, a piston operable in the cylinder and having a fluid passage and a chamber with which said passage connects, a member forming an end wall for said chamber and having screw connection with the piston, said member having an opening radially offset to correspond with said offset recess, a valve controlling said passage, a valve spring between said valve and said member, means projecting from said member through the opening of said member and engageable in said recess for adjusting said screw connection, and a spring in said chamber acting to project the last-mentioned means but permitting retraction into the chamber when the piston bottoms against the end wall of the cylinder, said last named spring engaging said means and exerting thrust thereon and on said member to prevent an undesired rotation of said member.

2. In a shock absorber, a cylinder having an end wall provided with radially offset recesses, a piston operable in the cylinder and provided with an internally threaded chamber and a fluid passage, a plug for the said chamber having openings offset radially to correspond with said recesses, a valve for said passage, a valve spring between the valve and plug, said plug having screw connection with the internally threaded portion of the piston and being rotatable for adjusting the valve spring, and a plug-rotating member having arms projecting through the openings of the plug and engageable in the recesses of said end wall.

3. In a shock absorber, a cylinder having an end wall provided with radially offset recesses, a piston operable in the cylinder and provided with an internally threaded chamber and a fluid passage, a plug for the said chamber having openings offset radially to correspond with said recesses, a valve for said passage, a valve spring between the valve and plug, said plug having screw connection with the internally threaded portion of the piston and being rotatable for adjusting the valve spring, a plug-rotating member having a body portion in said chamber and arms projecting through the openings of the plug and engageable in the recesses of said end wall, and a second spring yieldingly holding said body portion against said plug.

4. In a fluid shock absorber, a cylinder member, a piston member relatively slidable therein, valve means for controlling the flow of fluid caused by sliding movement of said piston member in said cylinder member, means for adjusting the operative characteristics of said valve means, elements carried by said members and cooperatively interengaging when said piston member is in a predetermined position in said cylinder member and upon relative rotation of said members effecting an actuation of said second named means, one of said elements being movable independently of the member by which it is carried and having spaced interconnected parallel portions, and spring means acting on said one element to constantly urge it in one direction.

5. In a shock absorber, a cylinder having an end wall, a piston operable in the cylinder and provided with a fluid passage, a valve carried by said piston and operatively associated with said passage, rotatable means carried by said piston for adjusting the operative characteristics of said valve, said rotatable means and said end wall being provided with elements which are cooperatively engageable when said piston is in a predetermined relative position in said cylinder, one of said elements being movable relative to its support longitudinally of said cylinder, and spring means for resisting said longitudinal movement of said one element in one direction, said one element having spaced interconnected portions extending longitudinally of the cylinder.

DONALD L. CHRISTOFEL.